(12) United States Patent
Godwin, Jr.

(10) Patent No.: US 12,227,118 B2
(45) Date of Patent: Feb. 18, 2025

(54) AUTOMATED SPEED-TRIGGERED BED LOWERING SYSTEM AND METHOD WITH MANUAL OVERRIDE

(71) Applicant: James Patrick Godwin, Jr., Dunn, NC (US)

(72) Inventor: James Patrick Godwin, Jr., Dunn, NC (US)

( * ) Notice: Subject to any disclaimer, the term of this patent is extended or adjusted under 35 U.S.C. 154(b) by 305 days.

(21) Appl. No.: 17/840,197

(22) Filed: Jun. 14, 2022

(65) Prior Publication Data

US 2023/0398921 A1    Dec. 14, 2023

(51) Int. Cl.
*B60P 1/16* (2006.01)
*B60R 25/01* (2013.01)
*B60R 25/23* (2013.01)
*G07C 5/02* (2006.01)

(52) U.S. Cl.
CPC ............... *B60P 1/16* (2013.01); *B60R 25/01* (2013.01); *G07C 5/02* (2013.01); *B60R 25/23* (2013.01)

(58) Field of Classification Search
CPC . B60P 1/16; B60R 25/01; B60R 25/23; G07C 5/02
See application file for complete search history.

(56) References Cited

U.S. PATENT DOCUMENTS

| | | | |
|---|---|---|---|
| 3,921,128 A * | 11/1975 | Snead ...................... | B60P 1/045 340/440 |
| 5,452,942 A * | 9/1995 | Brooks ................... | B60P 1/162 298/22 C |
| 11,377,805 B2 | 7/2022 | Godwin, Jr. | |
| 11,498,469 B2 * | 11/2022 | Wink ...................... | B60P 1/267 |
| 2005/0039968 A1 | 2/2005 | Lashua | |
| 2005/0234622 A1 | 10/2005 | Pillar et al. | |
| 2006/0231309 A1 | 10/2006 | Lashua | |

(Continued)

FOREIGN PATENT DOCUMENTS

CA      3072705 A1    8/2020

OTHER PUBLICATIONS

Jones, K., "Allied's Forward Controls put plow functions at driver's fingertips", APWA Snow Conference, May 28, 2019, pp. 1., Salt Lake City, Utah.

*Primary Examiner* — Isaac G Smith
*Assistant Examiner* — Nikki Marie M Molina
(74) *Attorney, Agent, or Firm* — COATS & BENNETT, PLLC

(57) ABSTRACT

A computerized control system controls a hydraulic subsystem of an articulated dump truck. Among other possible equipment, the hydraulic subsystem controls the raising and lowering of the dump truck bed. The control system detects the speed of the dump truck. Upon the dump truck traveling at or above a predetermined speed, the control system controls the hydraulic subsystem to automatically lower the dump truck bed. In various aspects, the predetermined speed may be preprogrammed, may be programmable by the truck operator, or may be programmable only by certain personnel (e.g., changing the speed may require entry of a password). In one aspect, a manual override switch prevents automatic lowering of the dump truck bed when the dump truck travels at or above the predetermined speed. In one aspect, the switch is a "dead man" switch, requiring continuous activation to prevent the automatic lowering.

17 Claims, 3 Drawing Sheets

(56) References Cited

U.S. PATENT DOCUMENTS

| | | |
|---|---|---|
| 2008/0024463 A1 | 1/2008 | Pryor |
| 2009/0105911 A1 | 4/2009 | Okeson et al. |
| 2010/0188343 A1 | 7/2010 | Bach |
| 2015/0070319 A1 | 3/2015 | Pryor |
| 2016/0075324 A1 | 3/2016 | Brombach et al. |
| 2016/0264032 A1 | 9/2016 | Terada et al. |
| 2017/0023127 A1 | 1/2017 | Greasamar et al. |
| 2017/0062148 A1 | 3/2017 | Legel |
| 2017/0344004 A1 | 11/2017 | Foster et al. |
| 2018/0198846 A1* | 7/2018 | Srinivasan ............ H04L 63/083 |
| 2018/0202539 A1 | 7/2018 | Shibata et al. |
| 2018/0244155 A1 | 8/2018 | Keenan et al. |
| 2020/0039432 A1* | 2/2020 | Lemieux ................. B60Q 9/00 |
| 2021/0156098 A1 | 5/2021 | Godwin, Jr. |

* cited by examiner

AUTOMATED SPEED-TRIGGERED BED LOWERING SYSTEM AND METHOD WITH MANUAL OVERRIDE

FIELD OF INVENTION

The present invention relates generally to articulated dump trucks, and in particular to a system and method of automatically lowering a raised bed of a dump truck if the truck exceeds a predetermined speed, with a constant manual override provision.

BACKGROUND

The global market for dump trucks in 2018 was $6.36B ($1.45B in the US alone), and is projected to increase to $10.83B by 2030. Dump trucks are used in mining, construction, waste management, snow and ice removal, and other industries. Growth in the dump truck market is driven by increased exploration in the mining industry, and sustaining investment in transportation infrastructure in the construction industry. Investment in new dump trucks is required to meet stringent emissions and other environmental controls, and to take advantage of technological advances.

One such technological advance is computer control of mechanical systems, which have conventionally been controlled manually. U.S. Patent Application Publication 2021/0156098, the disclosure of which is incorporated herein by reference in its entirety, describes a computerized control system, which may be implemented in a tablet computer or other similar controls, for driving a hydraulic subsystem and other equipment, such as a sand/salt spreader. The hydraulic subsystem may, in turn, drive equipment such as the articulated bed of a dump truck, a snowplow, or the like. Among other innovations, the '098 patent publication describes the significant safety advance of controlling the system via steering-wheel mounted buttons, allowing the operator to keep his eyes on the road.

A known problem with articulated dump trucks is collision with overhead structures and objects as the truck is driven with the bed raised. Operators may forget to lower the bed after a dumping operation, or may begin to drive with the bed in a partially-raised position, mistakenly thinking it had fully lowered. The result is often collision with overpasses, bridge superstructures, tree limbs, power lines, and the like.

To avoid these collisions, articulated dump trucks have been fitted with alarms—e.g. flashing lights and/or audible warnings—whenever the bed of the dump truck is at least partially raised. However, there are many operations, such as depositing gravel along a length of roadbed, in which the dump truck is intentionally driven with the bed raised to various angles. In these cases, the alarms are annoying and distracting, and have been known to be rendered inoperative by operators. This, of course, defeats their safety purpose in the general context.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to aspects of the present disclosure, a computerized control system controls the hydraulic subsystem of an articulated dump truck. Among other possible equipment, the hydraulic subsystem controls the raising and lowering of the dump truck bed. The control system detects the speed of the dump truck. Upon the dump truck traveling at or above a predetermined speed, if the dump truck bed is at least partially raised, the control system controls the hydraulic subsystem to automatically lower the dump truck bed, while simultaneously activating a visual/audible alarm. In various aspects, the predetermined speed may be preprogrammed, may be programmable by the truck operator, or may be programmable only by certain personnel (e.g., changing the speed may require entry of a password). In one aspect, a manual override prevents automatic lowering of the dump truck bed when the dump truck travels at or above the predetermined speed. In one aspect, the manual override is a "dead man switch," requiring continuous actuation to prevent the automatic lowering. In one aspect, the manual override feature may be disabled.

One aspect relates to a method of controlling a bed of an articulated dump truck. A speed of the dump truck is sensed. A position of the dump truck bed is sensed. The sensed speed of the dump truck is compared to a predetermined speed. If the dump truck bed is at least partially raised and the sensed speed of the dump truck equals or exceeds the predetermined speed, the dump truck bed is automatically lowered.

Another aspect relates to a controller configured to control a hydraulic subsystem of a dump truck. The controller includes memory and processing circuitry operatively connected to the memory. The processing circuitry is configured to sense a speed of the dump truck; sense a position of the dump truck bed; compare the sensed speed of the dump truck to a predetermined speed; and if the dump truck bed is at least partially raised and the sensed speed of the dump truck equals or exceeds the predetermined speed, control the hydraulic subsystem to automatically lower the dump truck bed.

Yet another aspect relates to a non-transitory machine-readable medium containing instructions which, when executed by a controller operatively connected to a hydraulic subsystem in a dump truck, are configured to cause processing circuitry in the controller to sense a speed of the dump truck; sense a position of the dump truck bed; compare the sensed speed of the dump truck to a predetermined speed; and if the dump truck bed is at least partially raised and the sensed speed of the dump truck equals or exceeds the predetermined speed, control the hydraulic subsystem to automatically lower the dump truck bed.

BRIEF DESCRIPTION OF THE DRAWINGS

The present disclosure will now be described more fully hereinafter with reference to the accompanying drawings, in which aspects of the disclosure are shown. However, this disclosure should not be construed as limited to the aspects set forth herein. Rather, these aspects are provided so that this disclosure will be thorough and complete, and will fully convey the scope of the disclosure to those skilled in the art. Like numbers refer to like elements throughout.

DETAILED DESCRIPTION

For simplicity and illustrative purposes, the present disclosure is described by referring mainly to an exemplary aspect thereof. In the following description, numerous specific details are set forth in order to provide a thorough understanding of the present disclosure. However, it will be readily apparent to one of ordinary skill in the art that the present disclosure may be practiced without limitation to these specific details. In this description, well known methods and structures have not been described in detail so as not to unnecessarily obscure the present disclosure.

Figure 1B:
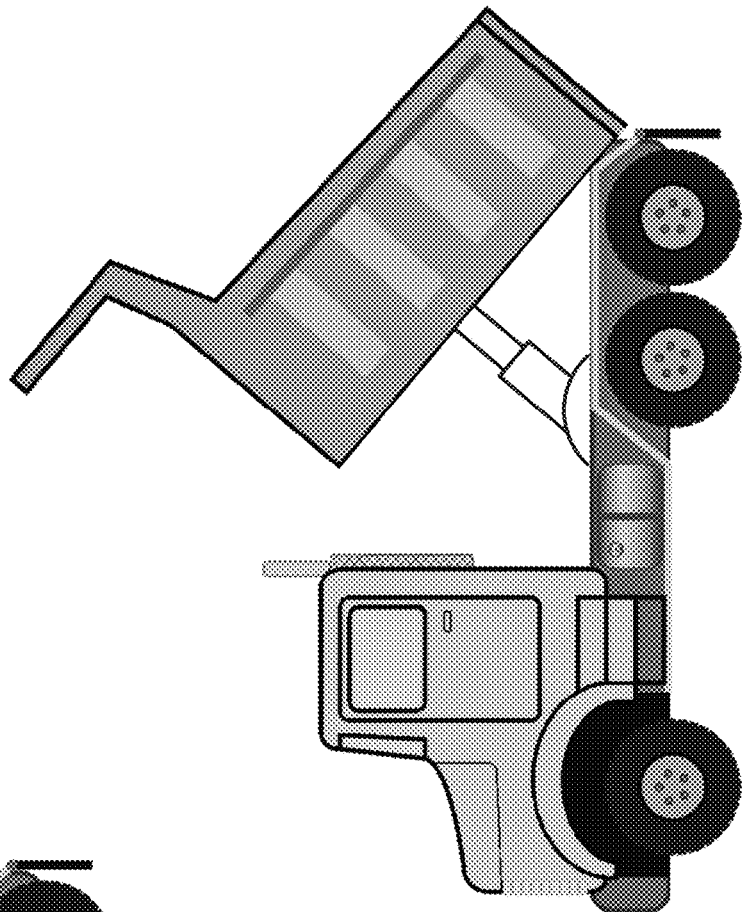
FIG. 1B depicts an articulated dump truck with the bed raised.
Figure 1A:
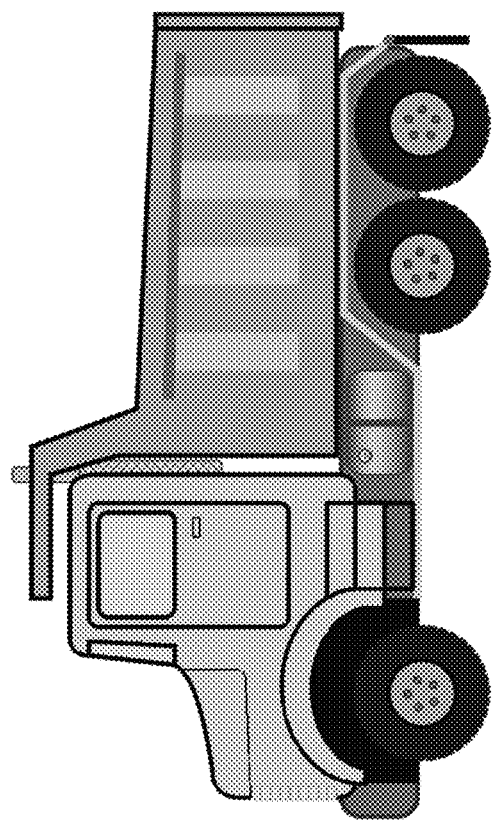
FIG. 1A depicts an articulated dump truck with the bed lowered.

FIG. 1A depicts an articulated dump truck with the bed lowered. This is the dump truck bed's normal position, in which the dump truck transports material contained in the bed. FIG. 1B depicts the dump truck bed in a raised position. The raised position is normally only used to discharge, or "dump," the truck's load. The dump truck requires a significantly higher vertical clearance when the bed is in the raised position, than when it is lowered. Accordingly, driving the dump truck with the bed raised presents a safety hazard.

Figure 2:
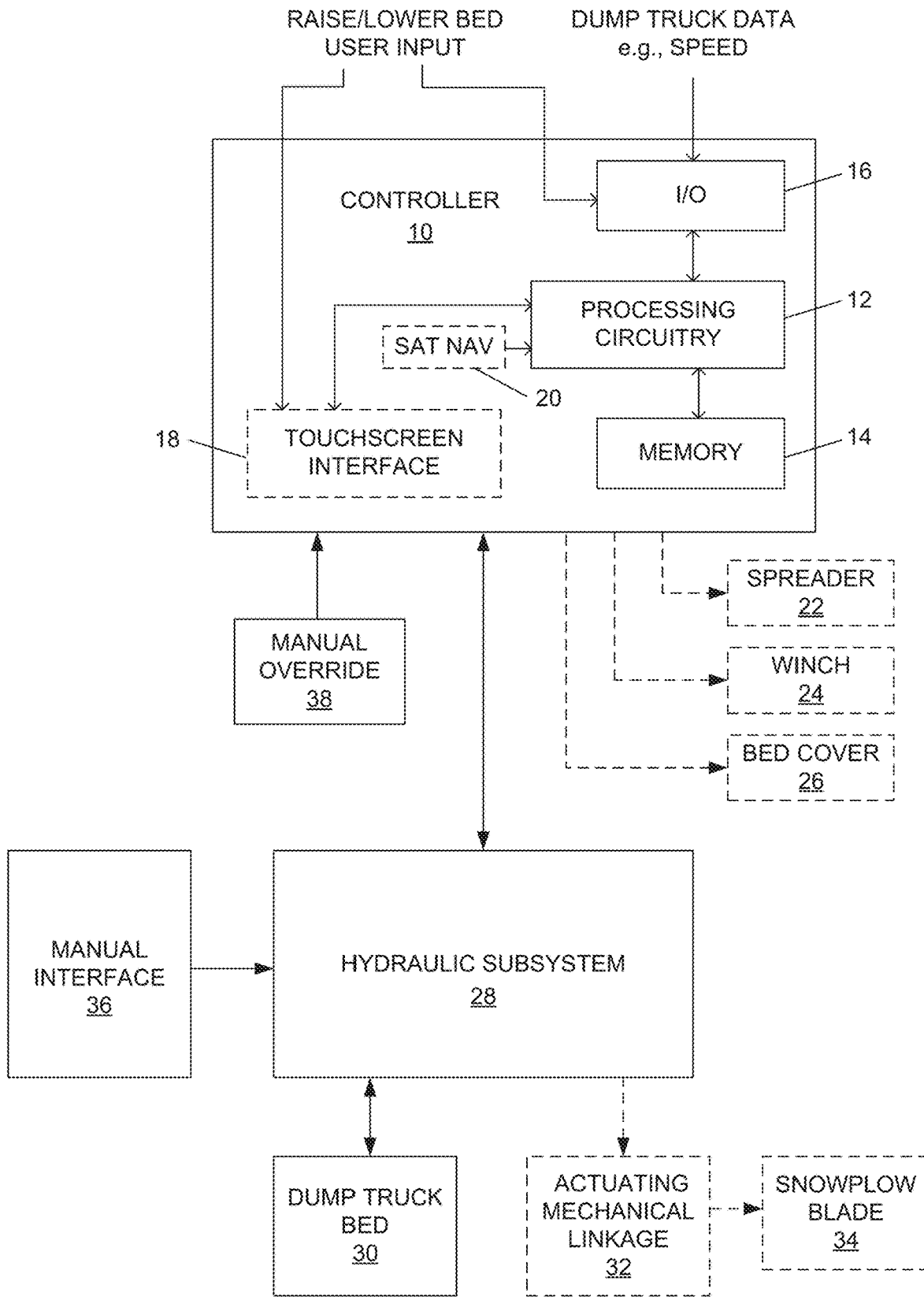
FIG. 2 is a block diagram of a control system for a dump truck.

FIG. 2 depicts a block diagram of a control system for a dump truck, according to aspects of the present disclosure. The system includes a computerized controller 10, which may for example be implemented with a tablet computer, integrated into the dump truck dashboard, part of the truck chassis computer system, or the like. The controller 10 includes processing circuitry 12, non-transitory memory 14, Input/Output (I/O) functionality 16, and optionally (as indicated by dashed lines) a touchscreen user interface 18 and optionally a satellite navigation module 20.

The processing circuitry 12 may comprise one or more hardwired state machines, programmable logic with associated firmware, one or more general purpose microprocessors or Digital Signal Processors with associated software, or any combination of these. The non-transitory memory 14 may comprise register files in the processing circuitry 12, solid state memory (e.g., DRAM, SRAM, SSD, Flash, etc.), optical media (e.g., CD, DVD), magnetic media, or any other type of non-transitory digital media known in the art. Although depicted as internal to the controller 10, the non-transitory memory 14 may include external data storage, such as an SD card, external disc drive, or the like. The I/O functionality 16 is configured to receive certain data and parameters from the dump truck, such as the truck's speed, whether it is in gear, and the like. As non-limiting examples, the I/O 16 may connect to an OnBoard Diagnostics (OBD) port of the dump truck, may comprise a node on a Controller Area Network (CAN) bus, or the like. The I/O 16 may additionally receive user input to raise or lower the dump truck bed, such as by a user pressing a rocker switch, or separate switches for the two functions. In one aspect, these switches may be located on the dump truck steering wheel, and may swap functionality between dump truck bed raise/lower input and conventional input (such as audio system control, cruise control, or the like), as described in the above-incorporated '098 patent publication. The user may additionally, or alternatively, input dump truck bed raise/lower commands via the touchscreen interface 18 of the controller 10.

In some aspects, the controller 10 may optionally (as indicated by dashed lines) control accessories and aftermarket equipment installed on the dump truck. Examples include a sand/salt spreader 22 on a dump truck configured as a snowplow; a winch 24; an automated bed cover 26; or other equipment.

The controller 10 controls a hydraulic subsystem 28. The hydraulic subsystem 28 controls raising and lowering of the dump truck bed 30. As indicated by double-headed arrows on the lines between the controller 10 and the dump truck bed 30, commands flow from the controller 10 to cause the dump truck bed 30 to raise and lower, and sensor data flows from the dump truck bed 30 (and hydraulics subsystem 28) to the controller 10, reporting at least the position of the dump truck bed 30. In some aspects (as indicated by dashed lines) the hydraulic subsystem 28 may additionally control hydraulic accessories and hydraulic aftermarket equipment installed on the dump truck, such as an actuating mechanical linkage 32 that controls the height, angle, and the like of a snowplow blade 34. The hydraulic subsystem 28 may additionally have a legacy manual interface 36.

A manual override switch 38, the purpose and function of which is described in greater detail herein, is connected to the controller 10.

Figure 3:
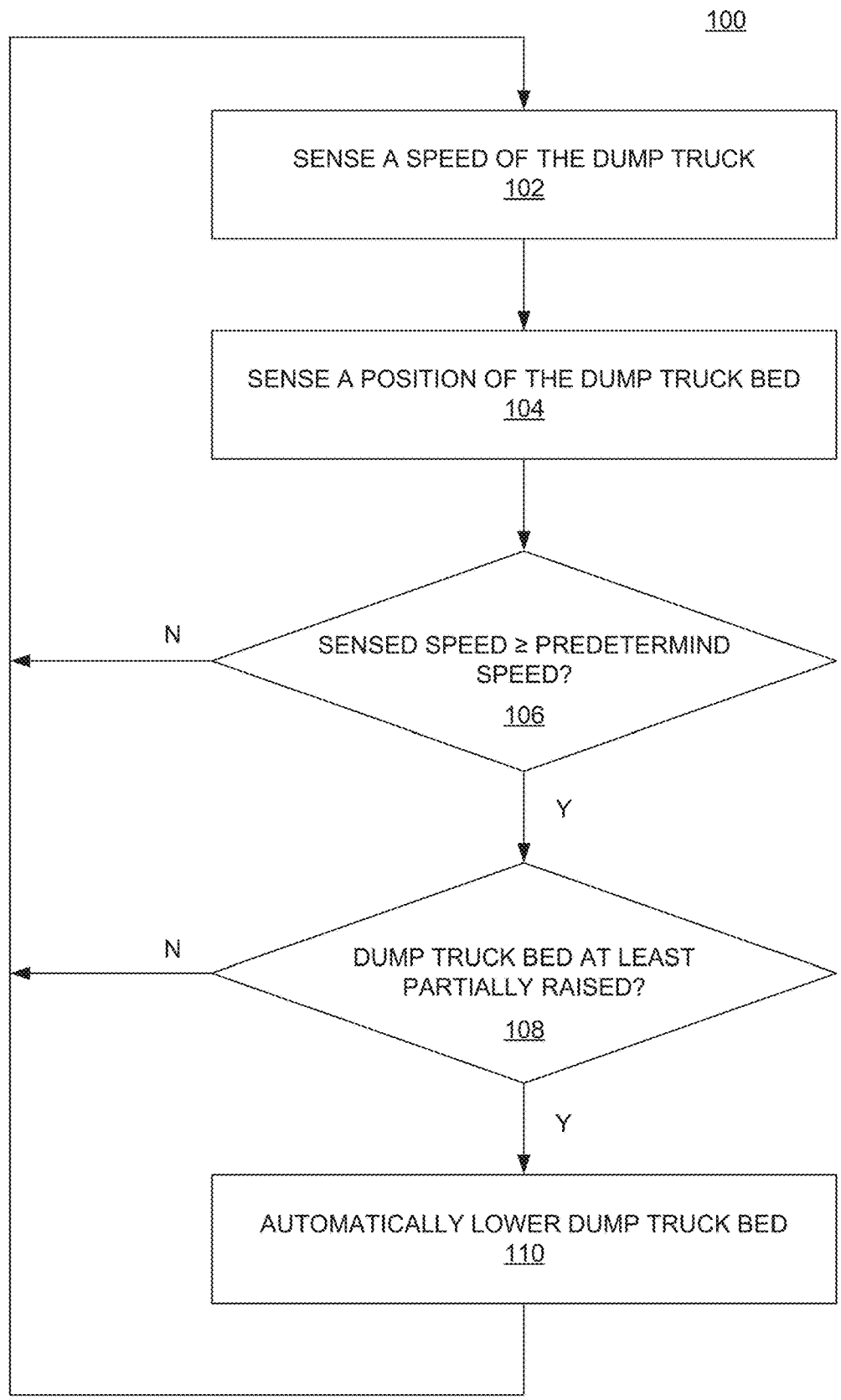
FIG. 3 is a flow diagram of a method of controlling a bed of a dump truck.

FIG. 3 depicts the steps in a method 100 performed by the controller 10, according to aspects of the present disclosure, in which the controller 10 controls the hydraulic subsystem 28 to automatically lower the dump truck bed if it is at least partially raised and the dump truck is moving at or greater than a predetermined speed. In particular, the controller 10 continuously or periodically senses a speed of the dump truck (block 102). For example, the controller 10 may obtain the speed from the I/O function 16, which may be connected to a CAN bus or other bus, or may monitor the dump truck OBD port. The I/O function 16 may read the dump truck speed directly, or the processing circuitry 12 may estimate the speed from other data, such as engine speed and gear, tire rotation speed, or the like. Alternatively, the controller 10 may obtain the dump truck speed from an integrated satellite navigation module 20 as shown or from an external satellite navigation module via the I/O function 16. The controller 10 additionally continuously or periodically senses a position of the dump truck bed (block 104). For example, the controller 10 may read the dump truck bed position from the hydraulic subsystem 28.

The controller 10 compares the sensed speed of the dump truck to the predetermined speed (block 106). If the sensed speed is less than the predetermined speed, the method 100 returns to monitoring the speed and dump truck bed position. However, if the sensed speed equals or exceeds the predetermined speed, the method 100 considers the position of the dump truck bed (block 108). If the dump truck bed is fully lowered, the method 100 returns to monitoring the speed and dump truck bed position. However, if the dump truck bed is at least partially raised, the controller 10 controls the hydraulic subsystem 28 to automatically lower the dump truck bed to the fully lowered position (block 110). During this actuation of the dump truck bed, the controller 10 may optionally issue a warning, in the form of a visual and/or audible alarm, that the dump truck is in motion greater than the predetermined speed with the dump truck raised, and that the bed is being lowered.

The predetermined speed may be stored in memory 14. In some aspects, the predetermined speed is configured at the factory (or dump truck customization shop) prior to delivery, and cannot be changed. This configuration may be appropriate, for example, for a fleet of dump trucks to be operated by a particular company or agency, or in a particular environment, with strict safety regulations regarding dump truck bed position while the dump truck is in motion. In other aspects, the predetermined speed may be changed in the field, but the ability to change it is limited to authorized personnel, such as a field supervisor or fleet manager. In this case, changing the predetermined speed may be password-protected. That is, a user attempting to change the predetermined speed is prompted to enter a password, and the predetermined speed is only changed if the password is verified. In some aspects, the predetermined speed may be changed by any user (or, upon verifying the password, the password verification itself may be disabled), as may be appropriate for a dump truck sold to a single owner/operator.

In some cases, such as when depositing gravel along a roadbed, it is appropriate to drive a dump truck while controlling the dump truck bed to assume increasingly raised positions. In these cases, particularly where a very low predetermined speed is configured, the automated lowering of the dump truck bed described above would interfere with proper operation of the dump truck. Accordingly, in some aspects, a manual override 38 is provided. The manual override 38 may comprise a button on the steering wheel or dashboard, a footswitch, a lever, touch screen technology, a button on a joystick or control yoke, or any other form of input. When the manual override 38 is actuated, the automated lowering of the dump truck bed is suspended. This allows a user to knowingly drive the dump truck above the predetermined speed without the dump truck bed being automatically lowered. For safety, in some aspects, the manual override 38 operates as a "dead man switch"—that is, it must be continuously actuated for the override function to take effect. If the manual override 38 is released, and the controller 10 senses the truck speed is at or greater than the predetermined speed, then it will automatically lower the dump truck bed. In some aspects, the controller 10 may be programmed to disregard the manual override 38, thus making the safety feature of automatically lowering the dump truck bed one that cannot be overridden or circumvented in any manner. In these aspects, disabling the manual override 38 may require entry of a password, as described above for changing the predetermined dump truck speed.

Aspects of the present disclosure present numerous advantages over the prior art. By automatically lowering the dump truck bed whenever the dump truck is driven in excess of a predetermined speed with the bed at least partially raised, potential collision with overhead objects is avoided. Because the hydraulics subsystem 28 is directly controlled by a computerized controller 10, a user cannot disable or circumvent the safety feature of automatically lowering the dump truck bed. In some aspects, the predetermined speed that triggers automatic lowering of the dump truck bed is user-configurable. In some aspects, a manual override 38 allows for limited bypass of the safety feature of automatic dump truck bed lowering. Both of these configuration options may be password-protected, providing organizations with flexibility in setting and enforcing the safety protocols.

The present disclosure may, of course, be carried out in other ways than those specifically set forth herein without departing from essential characteristics of the disclosure. The present aspects are to be considered in all respects as illustrative and not restrictive, and all changes coming within the meaning and equivalency range of the appended claims are intended to be embraced therein.

What is claimed is:

1. A method of controlling a bed of an articulated dump truck, comprising:
    sensing a speed of the dump truck;
    sensing a position of the dump truck bed;
    sensing actuation of a manual override switch by a user;
    comparing the sensed speed of the dump truck to a predetermined speed; and
    if the dump truck bed is at least partially raised, automatically lowering the dump truck bed in response to and the sensed speed of the dump truck equaling or exceeding the predetermined speed and the manual override switch not being actuated; and
    if the dump truck bed is at least partially raised, refraining from automatically lowering the dump truck bed in response to the sensed speed of the dump truck equaling or exceeding the predetermined speed and the manual override switch being actuated.

2. The method of claim 1 further comprising emitting a warning in response to the dump truck bed being at least partially raised and the sensed speed of the dump truck equaling or exceeding the predetermined speed and the manual override switch not being actuated.

3. The method of claim 2 wherein the warning is audible.

4. The method of claim 2 wherein the warning is visible.

5. The method of claim 1 wherein sensing actuation of a manual override switch is ongoing, and wherein the manual override switch must remain actuated to refrain from automatically lowering the dump truck bed.

6. The method of claim 1 further comprising:
    sensing that the manual override switch is not actuated; and
    if the dump truck bed is at least partially raised and the sensed speed of the dump truck equals or exceeds the predetermined speed, automatically lowering the dump truck bed in response to sensing non-actuation of the manual override switch.

7. The method of claim 1 further comprising:
    sensing user input; and
    changing the predetermined speed in response to user input.

8. The method of claim 7 further comprising, in response to user input to change the predetermined speed:
    receiving a password;
    verifying the password; and
    wherein changing the predetermined speed in response to user input comprises changing the predetermined speed only if the password is verified.

9. A controller configured to control a hydraulic subsystem of a dump truck, comprising:
    memory; and
    processing circuitry operatively connected to the memory, and configured to sense a speed of the dump truck;
    sense a position of the dump truck bed;
    sense actuation of a manual override switch by a user;
    compare the sensed speed of the dump truck to a predetermined speed;
    if the dump truck bed is at least partially raised, control the hydraulic subsystem to automatically lower the dump truck bed in response to the sensed speed of the dump truck equaling or exceeding the predetermined speed and the manual override switch not being actuated; and
    if the dump truck bed is at least partially raised, control the hydraulic subsystem to refrain from automatically lowering the dump truck bed in response to the sensed speed of the dump truck equaling or exceeding the predetermined speed and the manual override switch being actuated.

10. The controller of claim 9 wherein the processing circuitry is further configured to emit a warning in response to the dump truck bed being at least partially raised and the sensed speed of the dump truck equaling or exceeding the predetermined speed and the manual override switch not being actuated.

11. The controller of claim 10 wherein the warning is audible.

12. The controller of claim 10 wherein the warning is visible.

13. The controller of claim 9 wherein the processing circuitry is configured to continuously sense actuation of the manual override switch, and wherein the manual override switch must remain actuated to refrain from controlling the hydraulic subsystem to automatically lower the dump truck bed.

14. The controller of claim 9 wherein the processing circuitry is further configured to:
   sense that the manual override switch is not actuated; and
   if the dump truck bed is at least partially raised and the sensed speed of the dump truck equals or exceeds the predetermined speed, control the hydraulic subsystem to automatically lower the dump truck bed in response to sensing non-actuation of the manual override switch.

15. The controller of claim 9 wherein the processing circuitry is further configured to:
   sense user input; and
   change the predetermined speed in response to user input.

16. The controller of claim 15 wherein the processing circuitry is further configured to, in response to user input to change the predetermined speed:
   receive a password;
   verify the password; and
   wherein the processing circuitry is configured to change the predetermined speed in response to user input by changing the predetermined speed only if the password is verified.

17. A non-transitory machine-readable medium containing instructions which, when executed by a controller operatively connected to a hydraulic subsystem in a dump truck, are configured to cause processing circuitry in the controller to:
   sense a speed of the dump truck;
   sense a position of the dump truck bed;
   sense actuation of a manual override switch by a user;
   compare the sensed speed of the dump truck to a predetermined speed; and
   if the dump truck bed is at least partially raised, control the hydraulic subsystem to automatically lower the dump truck bed in response to the sensed speed of the dump truck equaling or exceeding the predetermined speed and the manual override switch not being actuated; and
   if the dump truck bed is at least partially raised, control the hydraulic subsystem to refrain from automatically lowering the dump truck bed in response to the sensed speed of the dump truck equaling or exceeding the predetermined speed and the manual override switch being actuated.

* * * * *